C. C. KEESLER.
MOTOR VEHICLE.
APPLICATION FILED APR. 26, 1917.
1,312,993.
Patented Aug. 12, 1919.
3 SHEETS—SHEET 2.
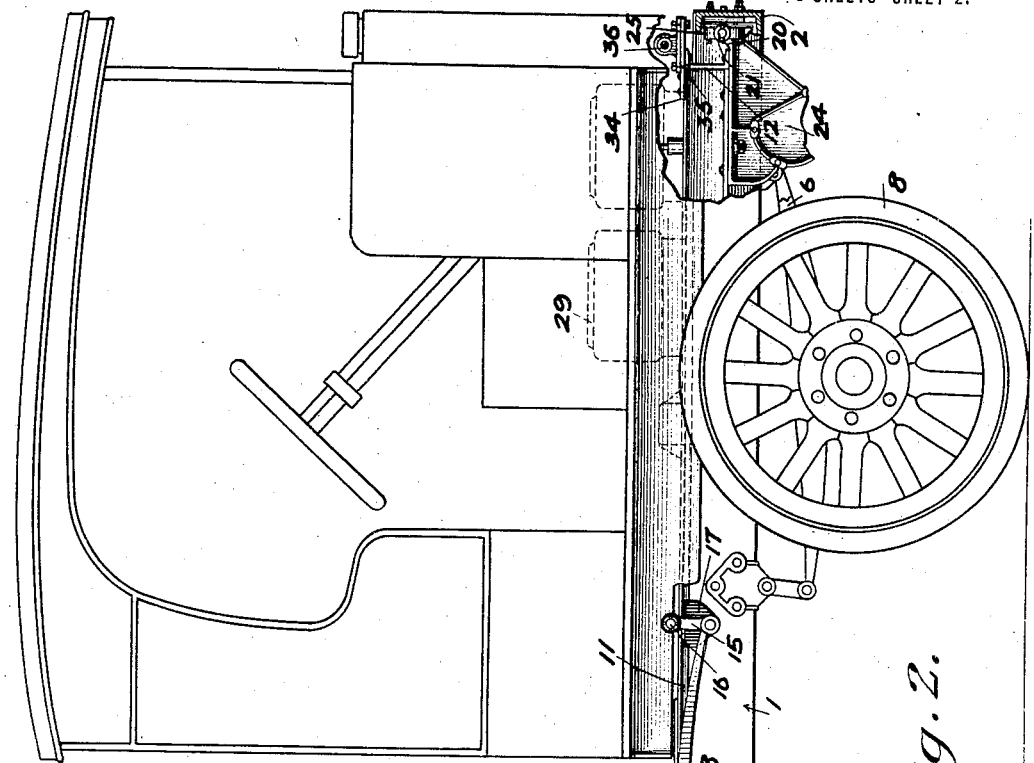
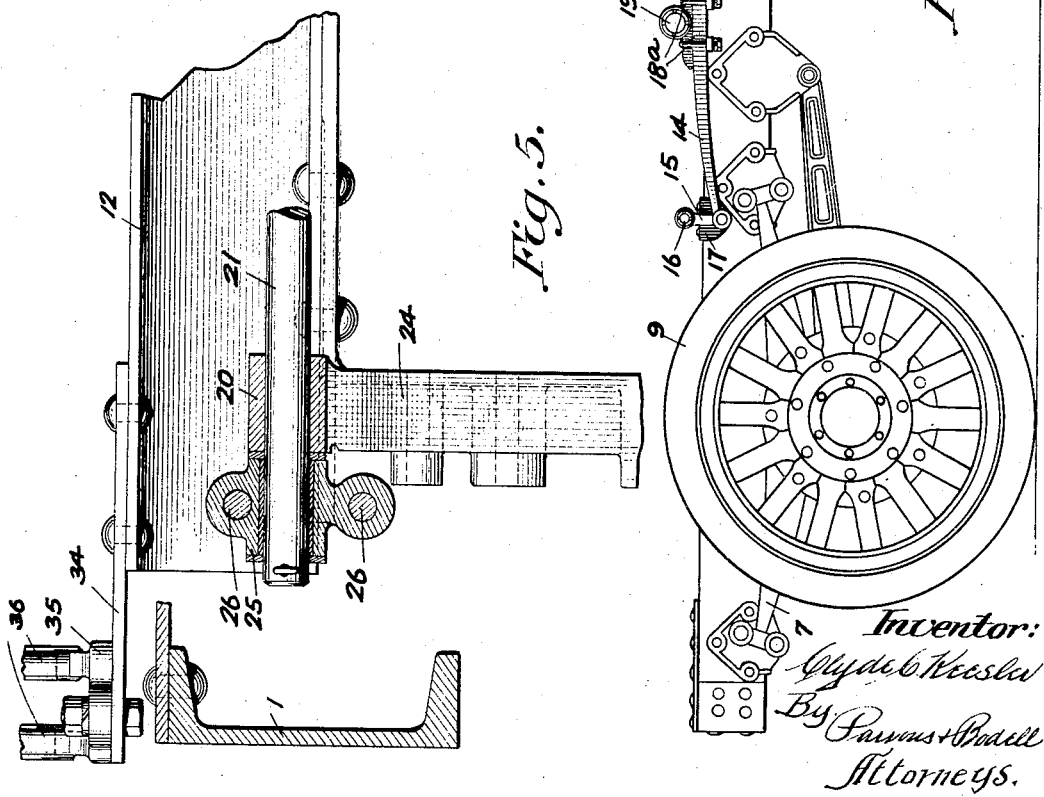
Inventor:
Clyde C Keesler
By Parsons + Bodell
Attorneys.

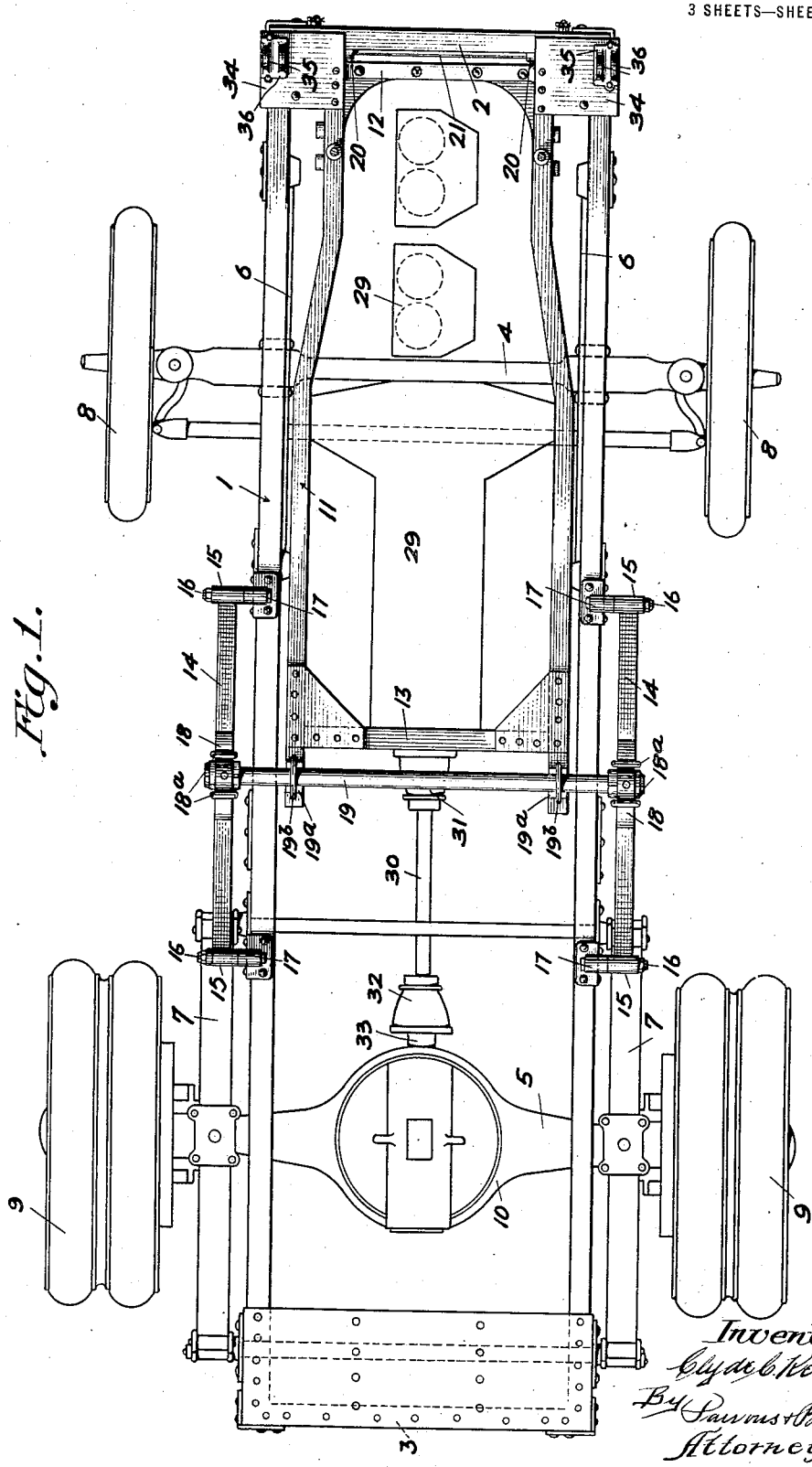

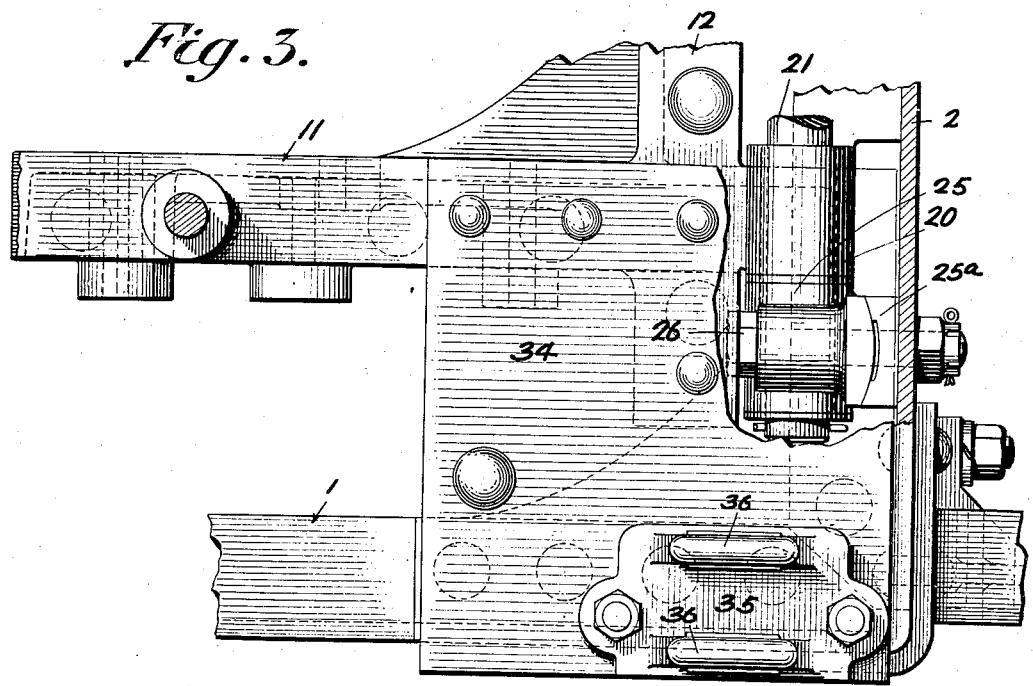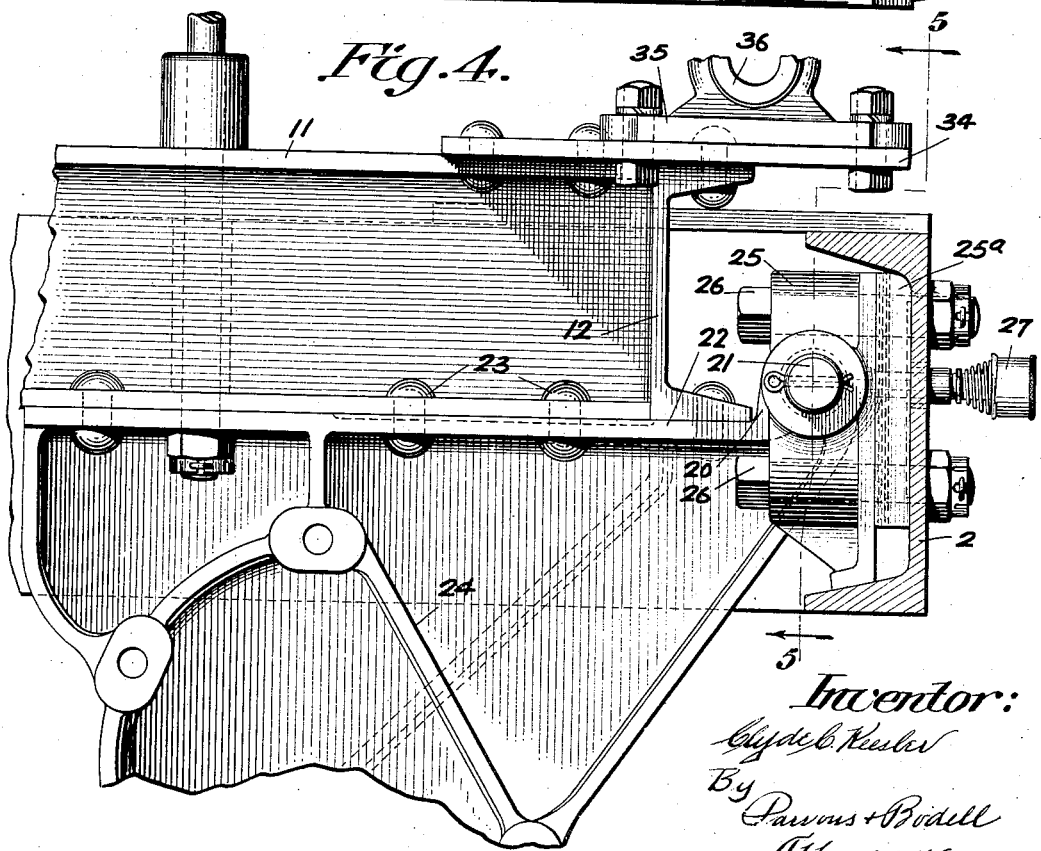

UNITED STATES PATENT OFFICE.

CLYDE C. KEESLER, OF CANASTOTA, NEW YORK, ASSIGNOR TO WATSON WAGON COMPANY, OF CANASTOTA, NEW YORK, A CORPORATION OF NEW YORK.

MOTOR-VEHICLE.

1,312,993.  Specification of Letters Patent.  Patented Aug. 12, 1919.

Application filed April 26, 1917. Serial No. 164,660.

*To all whom it may concern:*

Be it known that I, CLYDE C. KEESLER, a citizen of the United States, and a resident of Canastota, in the county of Madison and State of New York, have invented a certain new and useful Motor-Vehicle, of which the following is a specification.

This invention relates to motor vehicles and has for its object a particularly simple and efficient construction especially applicable for trucks, by which construction the main load is carried by the main frame and supported by the comparatively stiff springs thereof, and the power plant and related parts are carried by a sub-frame supported by weaker springs interposed between the main frame and the sub-frame so that the power plant and related parts are relieved of the heavy shocks and jars of the main loads. The invention consists in the novel features and in the combinations and constructions hereinafter set forth and claimed.

In describing this invention, reference is had to the accompanying drawings, in which like characters designate corresponding parts in all the views.

Figure 1 is a plan view of the chassis containing one embodiment of my invention.

Fig. 2 is a side elevation of parts seen in Fig. 1.

Fig. 3 is a fragmentary view, partly broken away, of one of the front corners of the main frame and sub-frame.

Fig. 4 is an elevation, partly in section, of parts seen in Fig. 3.

Fig. 5 is a section on the plane of line 5—5, Fig. 4.

This motor vehicle comprises, generally, a main frame, main springs supporting the main frame, a sub-frame movably carried by the main frame, springs interposed between the main frame and the sub-frame, and a power plant and related parts carried by the sub-frame.

1 designates the main frame which includes front and rear cross-bars 2, 3, and side sills. 4, 5 are the front and rear axles, and 6, 7 are respectively the front and rear comparatively stiff springs between the axles and the main frame.

8 and 9 are respectively the front and rear wheels mounted on the axle 4 or the steering knuckles thereof and on the rear axle 5. The rear axle 5 includes the usual shaft sections connected by a differential gearing, and the casing 10 inclosing the shaft sections and the differential gearing.

11 designates the sub-frame which includes channel iron sills and front and rear channel-iron cross-bars 12, 13, this sub-frame 11 being here shown as pivotally mounted at its front end to the main frame near the front end thereof, and as spring supported at its rear end.

14 designates the springs which are interposed between the main frame and the sub-frame 11, these springs being shown as semi-elliptical leaf springs connected at their ends to links or shackles 15, which are pivoted at 16 to brackets 17 bolted to the side sills of the main frame. Each spring 14 is connected to the rear end of the sub-frame, which terminates midway between the ends of the main frame, by means of a bracket 18 connected to the intermediate part of the spring by U-shaped clips 18$^a$ and by a shaft or spindle 19 mounted in a bracket connected to the rear end of the contiguous side sill of the sub-frame 11 in the rear of the rear cross-bar 13.

This shaft 19 extends across the sub-frame and the end portions thereof engage the brackets 18. The shaft 19 is connected to the side sills by means of seats or brackets 19$^a$ and U-shaped clips 19$^b$ extending over the shaft 19 and into the upper flanges of the channel iron side sills 11. The shaft 19 extends above the sills of the main frame laterally to the outside of the main frame, and the springs 14 are also located on the outside of the main frame as far apart as practical, to prevent undue rocking.

The front end of the sub-frame 11 is provided with suitable bearings 20 mounted upon a shaft 21 carried in bearings on the front cross-bar 2 of the main frame, each bearing 20 being supported by a bracket 22 secured as by rivets 23 to the lower flange of the channel iron side sills of the sub-frame 11. The bracket 22 includes a depending portion 24 for supporting the steering mechanism associated with the steering wheel.

25 designates the bearings for the shaft 21, these bearings being clamped by bolts 26 against brackets 25$^a$ filling the channel iron cross-bar 2, as in my pending application, Sr. No. 164659, filed April 26, 1917. Each bearing is lubricated by a suitable grease cup 27.

29 designates the motor, transmission gearing and other parts constituting the power plant, which are supported by the sub-frame. 30, 31, 32, and 33 designate the flexible shaft connections between the power plant and the differential gearing.

34 are plates or brackets supported at the front corners of the sub-frame and overhanging the corners of the main frame, each plate supporting a bracket 35 carrying bearings 36 in which the radiator of the power plant is supported, all as in my pending application referred to.

The cab, gasolene tank, and steering mechanism are also supported by the sub-frame, as described in my co-pending application. In my co-pending application, the sub-frame is supported by springs mounted on the rear axle, but in this application, the springs supporting the sub-frame are interposed between the main frame and the sub-frame and are located on the outside of the main frame in order to get the greatest possible leverage against rocking movement of the sub-frame relatively to the main frame.

What I claim is:—

1. A motor truck comprising a main frame, front and rear springs supporting the main frame for carrying the load, a sub-frame pivoted at its front end to the front end of the main frame, springs interposed between the intermediate part of the main frame and sub-frame and mounted on the sills of the main frame between the front and rear springs, and a body and power plant carried by the sub-frame, substantially as and for the purpose described.

2. A motor vehicle comprising a main frame, springs supporting the main frame, a sub-frame including side members located between and near the side sills of the main frame, springs for supporting the sub-frame located outside of the side sills of the main frame, and a power plant carried by the sub-frame, substantially as and for the purpose described.

3. A motor vehicle comprising a main frame, springs supporting the main frame, a sub-frame located between the side sills of the main frame and pivoted at its front end to the main frame near the front end of the latter, spindles on the rear end of the sub-frame extending to the outside of the main frame, springs mounted on the main frame on the outside of the side sills and coacting with said spindles, and a power plant carried by the sub-frame, substantially as and for the purpose specified.

4. A motor vehicle comprising a main frame, springs supporting the main frame, a sub-frame located between the side sills of the main frame, spindles extending laterally from the sub-frame to the outside of the main frame crosswise of the sills of the main frame, and springs on the outer sides of the sills of the main frame and coacting with the spindles, substantially as and for the purpose set forth.

5. A motor vehicle comprising a main frame, springs supporting the main frame, a sub-frame located between the side sills of the main frame and pivoted at its front end to the main frame near the front end of the latter and terminating between the ends of the main frame, a shaft carried at the rear end of the sub-frame and having its end portions extending laterally above and across the side sills of the main frame, and springs carried by the sills of the main frame on the outer sides thereof and connected to the end portions of the shaft, substantially as and for the purpose described.

In testimony whereof, I have hereunto signed my name at Syracuse, in the county of Onondaga, and State of New York, this 18 day of April, 1917.

CLYDE C. KEESLER.